United States Patent Office 3,267,080
Patented August 16, 1966

3,267,080
REACTION PRODUCT OF AN ORGANIC DIISO-
CYANATE WITH A POLYMERIC FAT ACID-
DIALKANOLAMINE CONDENSATE
Marwan R. Kamal, Minneapolis, Minn., assignor to General Mills, Inc., a corporation of Delaware
No Drawing. Filed Mar. 9, 1965, Ser. No. 438,400
5 Claims. (Cl. 260—77.5)

This application is a continuation in part application of my copending application U.S. Serial No. 269,713, filed April 1, 1963, now abandoned.

This invention relates to polyol-polyisocyanate products and more specifically to the condensation products of a polyisocyanate with the condensation product of polymeric fat acids or esters with dialkanolamines, and to their use in polyurethane coating compositions.

Reactions of polyols with polyisocyanates in preparing polyurethane coatings are well known. However, there are drawbacks to materials currently employed in this field. The polyols are of rather low molecular weight and relatively high ratios of polyisocyanates are required to react to give polyurethane coatings. This coupled with relatively high cost of the isocyanates and limited flexibility of the polyurethane coatings so derived has made room for improvements in this field.

An object therefore of the present invention is to provide a novel condenastion product of certain polyhydroxy compounds with polyisocyanates.

A further object of this invention is to provide polyurethane coatings having superior characteristics and a wider range of application than the now existing materials.

Other objects and advantages will be expressed in the more detailed descriptions below.

The polyhydroxy compounds employed in the present invention may be derived from polymeric fat acids or esters reacted with dialkanolamines. The condensation of alkanolamines with acids is a procedure well known in the art. However, the specific compounds of the present invention are the polyhydroxy compounds of the general type characterized as disubstituted amides, such as the reaction products of polymeric fat acids and dialkanolamines.

The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are referred to herein as "dimeric fat radical" and "trimeric fat radical," respectively. The term "fat acids" is intended to include saturated, ethylenically unsaturated and acetylenically unsaturated naturally occurring and synthetic monobasic aliphatic acids containing from 8–24 carbon atoms.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clyays, di-t-butyl peroxide, boron trifluoride and other Lewis acids, anthraquinone, sulfur dioxide and the like. Suitable monomers include the branched or straight chain, poly- and mono-ethylenically unsaturated acids such as 3-octenoic acid, 11-dodecenoic acid, linderic acid, laurileic acid, myristoleic acid, tsuzuic acid, palmitoleic acid, petroselinic acid, oleic acid, elaidic acid, vaccenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids. Generally mixtures of these acids are found in tall oil fatty acid which is commonly employed commercially in the preparation of the polymeric fat acids.

Typical compositions of commercially available polymeric fat acids, based on unsaturated $C_{18}$ fat acids of tall oil fatty acids are:

Percent by wt.
$C_{18}$ monobasic acids ("monomer") _____ 5–15
$C_{36}$ dibasic acids ("dimer") _____ 60–80
$C_{54}$ (and higher) ("trimer") polybasic acids ____ 10–35

Commercially available polymeric fat acids may be used "as is." However, it may be preferable to utilize purified fractions, that is, fractions rich in dimeric fat acid content, obtained, for example, by conventional techniques of distillation or solvent extraction. They may be hydrogenated (before or after distillation) to reduce unsaturation under hydrogen pressure in the presence of a hydrogenation catalyst.

The dialkanolamines employed may be represented by the general formula

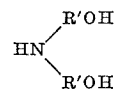

where R' is a divalent aliphatic hydrocarbon radical having from 1 to 8 carbon atoms, such as

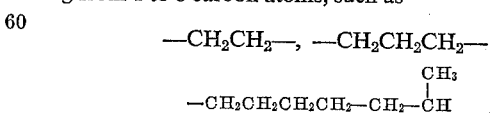

and the like.

The products resulting from the reaction of a polymeric fat acid or ester and dialkanolamine may be represented by the formula

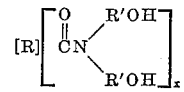

where R is the hydrocarbon group of a polymeric fat acid, $x$ is 2 to about 4 and R' is as described above.

The general reaction in preparing polyhydroxy compounds from polymeric fat acid derivatives and dialkanolamines in this present invention is given by the following reaction:

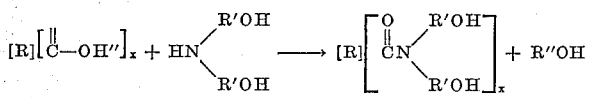

where R, R' and $x$ are as defined above, and R" is hydrogen or a lower alkyl group having from 1 to 8 carbon atoms.

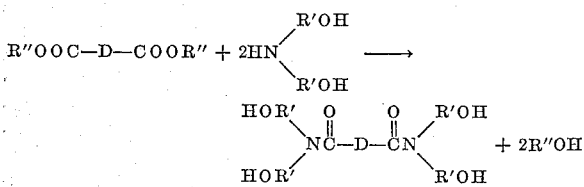

where D is a dimeric fat radical, i.e., the divalent hydrocarbon radical of the dimer acids produced by polymerization of unsaturated fatty acids and R' and R" are as defined above. A more specific reaction would be

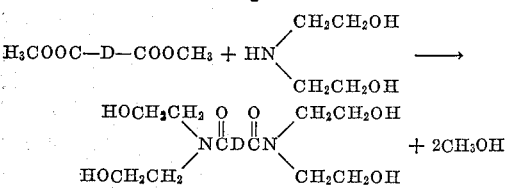

Generally, these products are classified as polyhydroxy alkalamides of polymeric fat acids. Specifically, the dimer derivative is named tetrakis-(2-hydroxyethyl) dimeramide.

Preferably, the polyhydroxy compounds of the present invention are prepared by one of two routes: the reaction of a dimer acid with diethanolamine, or the reaction of a dimethyl dimerate with diethanolamine.

The first method comprises the condensation of a dimer derivative is named tetrakis-(2-hydroxyethyl) di- in a high boiling solvent such as xylene. Normally an excess of the theoretical amount of diethanolamine is employed in the reaction. The reaction mixture is heated to a temperature of no more than about 150° C. Temperatures in excess of this can cause esterification side reactions. At elevated temperatures a water-xylene (or methanol-xylene when the ester is employed) azeotrope distills and the reaction is continued until the theoretical amount of water or methanol has been collected. The excess xylene and diethanolamine are then removed by distillation or extraction.

The second method, which is preferred, involves the condensation of a dimeric fat acid ester with diethanolamine. This is a solventless system with the reaction being catalyzed with, for example, sodium methoxide and carried out at reduced pressure and a relatively low temperature, generally no higher than about 80° C. At this temperature methanol distills off and the reaction is completed in about 5 hours. The excess reactant materials are then removed by distillation under reduced pressure.

The preferred conditions for the dimer acid route entail using a ratio of diethanolamine to dimer acid of 2.4 to 1; however, ratios of 2:1 up to 4:1 may be employed. These products are reacted in xylene at temperatures preferably from 135–145° C. Generally, the methanol-xylene azeotrope begins to distill at about 89–90° C. The heating is continued in the above said range until the theoretical amount of water is collected. Normally, this takes about 5 hours. The solution is then cooled and the excess xylene and diethanolamine removed under vacuum (approximately 0.1 p.s.i. at 125° C.). Any remaining diethanolamine may be removed by dissolving the residue in benzene and washing this solution with saturated sodium chloride until the aqueous phase is neutral. The organic phase can then be dried and the solvent removed under reduced pressure.

Optimum conditions for the ester method of preparing the product entails a ratio of diethanolamine to dimethyl dimerate of 2.4 to 1 and heating to 75° C. at reduced pressure and in the presence of the sodium methoxide catalyst. In general, the same ratios of reactants as employed with the acids may be employed. A reaction time of about 5 hours is normally sufficient. The excess diethanolamine and catalyst are removed by dissolving the product in a xylene-isopropanol mixture (10 to 1) and extracting the resultant solution with 90% sodium chloride until the aqueous phase is neutral. The organic phase is then dried and the solvent removed under vacuum.

The products so attained have secondary amine values and acid values near zero.

A typical analysis of the product is as follows:

| Solvent Method | OH No. | Sap. No. | Total Amine No. | Tertiary Amine No. |
|---|---|---|---|---|
| From dimer acid | 215.6 | 138.3 | 26.4 | 22.1 |
| From dimethyl dimerate | 225.0 | 118.0 | 36.0 | 35.3 |

The availability of the dimer acid makes it a more desirable starting material than the corresponding ester. However, the product obtained from the solventless ester method is a purer product.

The above preparative procedures are given by way of illustration only and are not meant to be limiting. Many methods of condensation to produce amide derivatives are well known to those skilled in the art.

The tetrakis-(2-hydroxyethyl) dimeramides or other polyhydroxyamides so derived are then employed in the preparation of polyurethane coatings by reaction with polyisocyanates.

A wide variety of polyisocyanates or polyisothiocyanates, or mixtures thereof, may be used in the preparation of the urethanes of the present invention. Representative of such polyisocyanates are:

methylene bis-(4-phenyl-isocyanate),
toluene-2,4-diisocyanate,
toluene-2,6-diisocyanate,
1,5-naphthalene diisocyanate,
p-phenylene diisocyanate,
3,3'-dimethyl-4,4'-diphenyl-methane diisocyanate,
4,4'-diphenyl-isopropylidine diisocyanate,
3,3'-dimethyl-4,4'-diphenyl diisocyanate,
hexamethylene diisocyanate,
ethylene diisocyanate,
butylene diisocyanate,
cyclopentylene-1,3-diisocyanate,
cyclohexylene-1,4-diisocyanate,
hexamethylene diisothiocyanate,
ethylene diiosthiocyanate,
p-phenylene diisothiocyanate,
benzene-1,2,4-triisothiocyanate and the like, or the longer chain polyisocyanates such as those based on polymeric fat acid radicals.

The polyisocyanates may be represented by the general formula

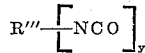

where R'" is selected from the group consisting of polyvalent aliphatic hydrocarbon radicals having from 2 to about 40 carbon atoms, polyvalent alicyclic hydrocarbon radicals having from about 5 to 20 carbon atoms, polyvalent aromatic hydrocarbon radicals having from 6 to about 10 carbon atoms, polyvalent aralkyl radicals having from 7 to about 24 carbon atoms, and $y$ is an integer of 2 to about 4. The corresponding polyisothiocyanates can also be employed.

The reaction of polyols with polyisocyanates to give polyurethane coatings can be represented by the following broad hypothetical formula

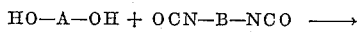

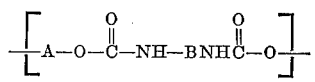

where A and B are the organic radical backbones of these hypothetical compounds.

The complex formula representing polyurethane coatings of the present invention as prepared from the reaction of our polyhydroxy compounds with polyisocyanates is as follows:

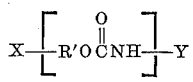

where X and Y are the complex polyradicals formed in the condensation of a polymeric fat acid of the general formula

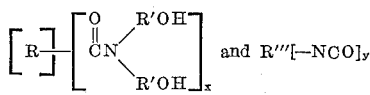

where R, R', R''', x and y are as described above.

The polyurethane coatings of the present invention may be prepared by thoroughly mixing a mixture of the polyhydroxy compound, for example, tetrakis-(2-hydroxyethyl) dimeramide, and a polyisocyanate in a proper solvent using various NCO (isocyanate group) to OH (hydroxy group) ratios. If desired, pigments or other additives can be readily incorporated therein. Preferably, the polyurethane coatings of the present invention are prepared by adding a diisocyanate such as Nacconate 80 (a mixture of 80% 2,4-toluene diisocyanate) or Mondur CB-75 (75% Cellosolve acetate solution of a toluene diisocyanate-trimethylolpropane prepolymer) to a solution consisting of the tetrakis-(2-hydroxyethyl) dimeramide in 50-50 by weight Cellosolve acetate-xylene mixture. An NCO to OH ratio of 1.2 to 1 for these coatings is employed as this appears preferable with respect to chemical and physical properties; however, a ratio of 0.9:1 up to 2:1 may be employed and at the higher ratios, preferably between 1.6:1 to 1.8 to 1, prepolymers may be prepared which are quite stable in the absence of moisture. After thorough mixing, the coatings are applied at about a 0.003 inch thickness on tin, steel, and glass. The characteristics exhibited by the coatings can then be studied.

These polyurethane coatings so produced have very desirable characteristics. They incorporate good chemical resistance with most of the common solvents except in the case of 50% sulfuric acid and 30% sodium hydroxide. They show particular superiority in resistance to aromatic type solvents and ketones.

In the presence of moisture, the two reactive components, once mixed, begin reacting and are stable for relatively short periods of time, usually in the order of several hours up to about 24 hours. This can be illustrated by determining the Gardner viscosity of appropriate mixtures. The pot life of the polyurethane coatings can be extended appreciably by incorporating a diol, such as butanediol, in the formulation. However, the chemical resistance is adversely affected. The pot life and physical properties of the coatings are not affected by small differences in solution concentration, as 40 or 50% solutions give identical properties.

An interesting characteristic of these polyurethane coatings is their curing time at low temperatures. For instance, a coating prepared from the tetrakis-(2-hydroxyethyl) dimeramide and Mondur CB-75 (75% cellosolve acetate solution of a toluene diisocyanate-trimethylolpropane prepolymer) has a curing time of only 3-4 hours at 40° F., and can be cured at temperatures as low as −10° C. This particular coating upon curing exhibits good pencil hardness (B), flexibility of 60% or better, and is highly favorable with respect to Tabor abrasion tests.

In order to more clearly illustrate certain embodiments of the invention, the following examples are included.

EXAMPLE I

*Preparation of tetrakis-(2-hydroxyethyl) dimeramide from dimer acid.*—Two hundred and seventy-five grams of distilled dimer acid (polymerized tall oil fatty acids having the analysis: acid value 195.8, Sap. No. 198.2, percent monomeric acid 1.2, percent dimer acid 98.8 and percent trimer acid 0.0), 115 grams of diethanolamine and 150 ml. of xylene were mixed together in a reaction vessel equipped with a stirrer, a temperature controller and a fractionation column connected to a condenser which leads into a trap. The mixture was heated to 135° C. A water-xylene azeotrope began to distill at 89–90° C. Heating was continued while maintaining the reaction temperature between 135–145° C. until the theoretical amount of water had been collected (approximately 18 ml.). This took about five hours. The solution was then cooled and the xylene removed under reduced pressure and the excess diethanolamine removed under high vacuum (ca. 125° C./0.1 mm.). Any remaining diethanolamine was further removed by dissolving the residue in 500 ml. of benzene and washing this solution with a saturated sodium chloride solution until the aqueous phase was neutral. The organic phase was then dried and the solvent removed under reduced pressure. A residue weighing 320 g. had the following analysis:

| | |
|---|---|
| Hydroxy No. | 215.6 |
| Saponification No. | 138.3 |
| Acid value | 0.0 |
| Total amine | 26.4 |
| Tertiary amine | 22.0 |

EXAMPLE II

*Preparation of tetrakis-(2-hydroxyethyl) dimeramide from dimethyl dimerate.*—One hundred and fifty parts dimethyl dimerate (the condensation product formed from the reaction of the distilled dimer acid of Example I, and methanol in the presence of p-toluenesulfonic acid. The product has the following analysis: saponification value 185.8 and acid value 0.58), 63 parts diethanolamine and 1.0 part sodium methoxide were mixed in a 500 ml. 3-neck flask equipped with a thermometer, a stirrer and an outlet leading to the water aspirator. The mixture was heated under reduced pressure (about 10 mm.) to 75° C. Around that temperature methanol started to distill off (some foaming was noted). The heating was continued while maintaining the temperature below 78° C. for 5 hours. The solution was then cooled and the excess diethanolamine and the sodium methoxide removed. This was accomplished by dissolving the product in a xylene-isopropanol mixture (10:1) and extracting the resulting solution with a 90% sodium chloride solution until the aqueous layer was neutral to litmus. The organic phase was then dried and the solvents removed under reduced pressure. The residue had the following analysis:

| | |
|---|---|
| Hydroxy No. | 265.2 |
| Saponification No. | 68.8 |
| Total amine | 0.80 |
| Tertiary amine | 0.02 |

EXAMPLE III

*Tetrakis-(2-hydroxyethyl) dimeramide based polyurethane coating—amide prepared from dimethyl dimerate.*—To a solution of 10.6 g. of tetrakis-(2-hydroxyethyl) dimeramide of Example II in 15.4 g. of a 50–50 by weight Cellosolve acetate-xylene mixture was added 4.8 of a mixture of 80% 2,4-toluene diisocyanate and 20% 2,6-toluene diisocyanate (Nacconate 80). The resulting mixture was shaken until well mixed, then applied as coatings having 0.003 inch thickness on tin, steel and glass panels. The following properties were observed:

Tack free time at room temperature _____ 2½ hours.
Gel time _____ 10+ hours.
Pencil hardness after 24 hours at room
    temperature _____ B.
Rocker hardness after 48 hours at room
    temperature _____ 50%.
Flexibility (impact) _____ 60%+.

EXAMPLE IV

*Tetrakis-(2-hydroxyethyl) dimeramide based polyurethane coating-amide prepared from dimethyl dimerate.*—To a solution of 21.2 g. of tetrakis-(2-hydroxyethyl) dimeramide of Example II in 38.9 g. of a 50–50 by weight Cellosolve acetate-xylene mixture was added 35.5 g. of a 75% Cellosolve solution of a toluene diisocyanate trimethylolpropane prepolymer (Mondur CB-75). After mixing, the resulting solution was applied as 0.003 inch thick coatings on steel, tin and glass panels. The coatings had the following properties:

Tack free time at room temperature _____ 2 hours.
Tack free time at 40° F. _____ 6 hours.
Gel time _____ 6 hours.
Pencil hardness after 24 hours at room
    temperature _____ B.
Rocker hardness after 48 hours _____ 47%.
Flexibility (impact) _____ 60%+.

EXAMPLE V

*Tetrakis-(2-hydroxyethyl) dimeramide based pigmented polyurethane coating-amide made from dimer acid.*—The following components were thoroughly mixed using steel balls and a Red Devil paint conditioning machine: 12.6 g. tetrakis-(2-hydroxyethyl) dimeramide of Example I, 18.0 Molybdate Orange, 6.0 g. CAB [a 10% solution of cellulose acetate butyrate in Cellosolve acetate/toluene, 1/1] and 17.4 g. Cellosolve acetate/xylene, 1/1. To this was added 21.3 g. of a 75% Cellosolve solution of a toluene diisocyanate trimethylolpropane prepolymer (Mondur CB-75). The resulting mixture was thoroughly mixed and then applied as a coating either by brushing or film casting on metallic surfaces. The coating had the following properties:

Tack free time at room temperature
    of a 0.003 inch thick wet coating __ 1½ hours.
Tack free time at 40° F. _____ Less than 18 hours.
Pencil hardness after 24 hours at
    room temperature _____ B.

EXAMPLE VI

*Tetrakis-(2-hydroxyethyl) dimeramide based pigmented polyurethane coating amide made from dimer acid.*—The procedure of Example V was repeated employing a formulation consisting of 11.4 g. tetrakis-(2-hydroxyethyl) dimeramide of Example I, 16.0 titanium dioxide, 0.4 g. lamp black, 36.3 g. Cellosolve acetate/xylene, 1/1, 9.8 g. of a 10% solution of Cellosolve acetate butyrate in Cellosolve acetate/toluene 1/1 (CAB), and 19.3 g. of a 75% Cellosolve solution of a toluene diisocyanate trimethylolpropane prepolymer (Mondur CB-75). The coating had the following properties:

Tack free time at room temperature of a 0.003
    inch thick wet coating _____ 2 hours.
Pencil hardness after 24 hours at room
    temperature _____ HB.
Rocker hardness _____ 47%.

EXAMPLE VII (A) *Preparation of the methyl ester of polymeric fat acids (1868–16).*—A mixture of 500 g. of a polymeric fat acid of polymerized tall oil aftty acids (acid value— 189.8, sap. value—198.9, percent monomer—10.4, percent dimer—74.5 and percent trimer—15.1), 1000 g. of methanol and 5 g. of p-toluene sulfonic acid were reacted in the same manner as described under Example I for the preparation of the diester of the distilled dimer acid. A 553 g. yield of the methyl ester was obtained which had the following analysis: acid value—0.53, saponification equivalent—186.4.

(B) *Reaction of the above ester with diethanolamine (1868–29, 45).*—A mixture of 301 g. of the above synthesized ester, 115.5 g. diethanolamine and 2.0 of sodium methoxide was reacted in the same manner as described under Example II. The product obtained had the following analysis: hydroxy value—263.5, total amine value— 1.23, tertiary amine value—zero.

(C) *Clear coatings based on the above polyhydroxy derivative.*—To a solution of 12.8 g. of the polyhydroxy compound (described in B above) in 18.5 g. of a 50–50 by weight Cellosolve acetate-xylene mixture was added 5.7 g. of Nacconate-80. After mixing, the resulting solution, was applied as 0.003 inch thick coatings on steel, tin and glass surfaces. The coating had the following properties:

Tack free time at room temperature    3 hours.
Gel time _____ Fluid after 10 hours.
Pencil hardness after 24 hours at
    room temperature _____    2B.
Extensibility (impact) after 9 days
    at room temperature _____    60%+.
Rocker hardness after 9 days _____    67%.

(D) *Pigmented coating based on the polyhydroxy derivatives described in B above.*—

|  | G. |
|---|---|
| Titanium dioxide | 16.0 |
| Polyhydroxy compound | 11.5 |
| CAB solution | 8.0 |
| Cellosolve acetate/xylene, 1/1 by wt. | 36.4 |

The above were ground well using glass beads and by shaking on a Red Devil paint conditioning machine for 30 minutes. Then 19.4 g. of Mondur CB-75 was added and shaken for another 5 minutes. Coatings were then applied on metal and glass surfaces. The following properties were observed.

Tack free time at room temperature    1¾ hours.
Gel time _____ Fluid after 12 hours.
Pencil hardness after 5 hours at
    room temperature _____    HB.
Extensibility after 8 days at room
    temperature _____    5%.

EXAMPLE VIII (A) *Preparation of the methyl ester from "Stripped Dimer."*—A mixture of 500 g. of stripped dimer acid of polymerized tall oil fatty acids (acid value—193.3, saponification value—201.4, percent monomer—0.3, percent dimer—81.4 and percent trimer—18.3), 1000 g. of methanol and 5 g. of p-toluene sulfonic acid were reacted in the same manner as described under Example I.

The product had the following analysis: acid value— 0.1, saponification value—187.2.

(B) *Condensation of the above ester with diethanolamine.*—A mixture of 299.7 g. of the ester described in A above, 126.0 g. of diethanolamine and 2.0 g. of sodium methoxide was reacted in the same manner as described under Example II. The product obtained had the following analysis: hydroxyl value—232.0, total amine value—5.52, tertiary amine value—3.50.

(C) *Clear coatings based on stripped dimeramide polyol.*—To a solution of 14.3 g. of the polyol described in B above in 20.0 g. of a 50–50 by weight Cellosolve acetate-xylene mixture was added 5.7 g. of Macconate-80. Coatings were applied from the above solution on steel, tin and glass panels. These coatings had the following properties:

Tack free at room temperature ____ 3 hours.
Gel time _____ Fluid after 8 hours.
Pencil hardness after 7 days at room temperature _____ B.
Extensibility (impact) after 7 days at room temperature _____ 60%+.
Rocker hardness after 7 days ____ 60%.

(D) *Pigmented coating based on stripped dimeramide polyol.—*

| | G. |
|---|---|
| Molybdate orange | 35.0 |
| Stripped dimeramide polyol in B above | 30.6 |
| CAB solution | 14.0 |
| Cellosolve acetate-xylene 50-50 by wt. | 54.4 |

The above components were ground on a Red Devil paint conditioner for 30 minutes. Then 11.6 g. of Nacconate–80 were added and the mixture stirred well. Coatings were applied from this mixture (0.003 inch thick) on tin, steel and glass panels. The following properties were observed:

Tack free time at room temperature _____ 2½ hours.
Gel time _____ 10 hours.
Pencil hardness after 24 hours at room temperature _____ B.
Extensibility (impact) after 7 days at room temperature _____ 60%+.
Rocker hardness _____ 37%.

As indicated earlier, prepolymers may be prepared which are stable in the absence of moisture. These prepolymers may then be used as one-component urethane type coatings which depend on atmospheric moisture for curing. These prepolymers are prepared as previously described. It is preferred, however, to use ratios of NCO to OH between 1.6 to 1.8. The prepolymer in an inert solvent is quite stable in the absence of moisture. Films of the solution cure in the presence of atmospheric moisture to form a hard coating which possesses excellent properties as a coating by displaying good flexibility, high gloss, abrasion and chemical resistance. Stabilizers may be added to the coating systems to extend the shelf life thereof. Illustrative of such stabilizer is benzoyl chloride. In cases where benzoyl chloride was used, the coating system was still fluid after several months in contrast to a shelf life of less than 30 days when the stabilizer was not employed. Such stabilizer is only necessary where extended shelf life is necessary. Any unreactive solvent may be employed. Solvent systems for the prepolymer include xylene, toluene, methyl Cellosolve acetate, ethyl acetate or mixtures thereof. Moisture, of course, must be absent if shelf life is desired.

The prepolymer and coatings therefrom may best be illustrated by means of the following examples:

EXAMPLE IX (A) *Preparation of prepolymer.—*One hundred grams of tetrakis-(2-hydroxyethyl)-dimeramide of Example I were dissolved in 263 g. dry xylene and 100 g. urethane grade Cellosolve acetate. The solution is then placed in a flask equipped with a stirrer, a water separator and a condenser. The solution is then heated to solvent reflux and any water present separates in the water separator.

The solution is then cooled to room temperature and added slowly to 78.3 g. of Nacconate–80 in a three-neck flask equipped with a stirrer, a nitrogen inlet and a drying tube. The addition is done at such a rate that the temperature of the mixture is maintained below 30° C. After the addition is complete (about 2 hours), the solution is stirred for another 20 minutes prior to adding 1.4 ml. of benzoyl chloride and the mixture is then stirred for another 2 hours, then removed from the flask and packaged under a dry nitrogen blanket.

The final product has an isocyanate content=3.7%.

Although this product did not show any appreciable change in viscosity after several weeks, a similar product which did not contain any benzoyl chloride gelled completely after a period of seven weeks (1868–62).

(B) *Coatings based on the above prepolymer.—*Three mil wet film coatings from the prepolymer described in Example A were applied on tin, steel and glass panels. The coatings were allowed to cure at 75° C. and 50% relative humidity. The following properties were observed:

Tack free time _____ 30 minutes.
Pencil hardness after 14 days _____ B.
G.E. extensibility after 14 days _____ Pass 60%.
Rocker hardness after 14 days _____ 62%.
Adhesion after 14 days _____ Excellent.

It should be understood, however, that these descriptions are given by way of illustration and explanation only, and not by way of limitation, as obvious changes may be made therein by those skilled in the art and the invention is to be limited only by the scope of the appended claims.

The embodiments of this invention in which an exclusive property or privilege is claimed are defined as follows:

1. The condensation product of (A) an organic compound selected from the group consisting of hydrocarbon polyisocyanates, hydrocarbon polyisothiocyanates and mixtures thereof with (B) a polyhydroxy compound of the formula

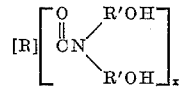

where R is the hydrocarbon radical of a polymeric fat acid, $x$ is an integer from 2 to 4 and R' is a divalent aliphatic hydrocarbon radical having from 1 to 8 carbon atoms.

2. The condensation product of claim 1 wherein R is a dimeric fat radical having from 16 to 48 carbon atoms.

3. The condensation product of claim 1 wherein R is a dimeric fat acid radical having 36 carbon atoms.

4. A condensation product as defined in claim 1 in which said polyhydroxy compound is tetrakis-(2-hydroxyethyl)-dimeramide.

5. The condensation product as defined in claim 1 in which said organic isocyanate is toluene diisocyanate.

References Cited by the Examiner
UNITED STATES PATENTS 3,139,437  6/1964  Peterson _____ 260—404.5
3,206,416  8/1965  Dahm et al. _____ 260—404.5

OTHER REFERENCES

Chem. Abstracts: vol. 55, paragraph 14954E, 1961.

LEON J. BERCOVITZ, *Primary Examiner.*

M. C. JACOBS, *Assistant Examiner.*